(12) United States Patent
Anderson et al.

(10) Patent No.: US 9,532,499 B2
(45) Date of Patent: Jan. 3, 2017

(54) SYSTEM AND METHOD TO MONITOR GASEOUS CONCENTRATIONS

(71) Applicant: Deere & Company, Moline, IL (US)

(72) Inventors: Noel W. Anderson, Fargo, ND (US); Christopher D. Turner, Waterloo, IA (US); Daniel P. Bruns, Ankeny, IA (US)

(73) Assignee: DEERE & COMPANY, Moline, IL (US)

( * ) Notice: Subject to any disclaimer, the term of this patent is extended or adjusted under 35 U.S.C. 154(b) by 64 days.

(21) Appl. No.: 14/548,962

(22) Filed: Nov. 20, 2014

(65) Prior Publication Data

US 2015/0373905 A1 Dec. 31, 2015

Related U.S. Application Data

(60) Provisional application No. 62/016,904, filed on Jun. 25, 2014.

(51) Int. Cl.
*G06F 7/70* (2006.01)
*A01C 21/00* (2006.01)

(52) U.S. Cl.
CPC ............ *A01C 21/00* (2013.01); *A01C 21/007* (2013.01)

(58) Field of Classification Search
CPC ............................ A01C 21/00; A01C 21/007
See application file for complete search history.

(56) References Cited

U.S. PATENT DOCUMENTS

| 5,520,125 A | 5/1996 | Thompson et al. |
| 5,967,066 A * | 10/1999 | Giles .................. A01C 23/024 |
| | | 111/119 |
| 7,487,732 B2 | 2/2009 | Johnston et al. |
| 7,490,564 B2 | 2/2009 | Allan et al. |
| 7,850,190 B2 | 12/2010 | Ruckle et al. |

(Continued)

FOREIGN PATENT DOCUMENTS

| CN | 2751514 Y | 1/2006 |
| CN | 103609363 A | 3/2014 |

(Continued)

OTHER PUBLICATIONS

Aboukarima, A; Khaled, A; Al-Janobi, A. "Modeling Water Infiltration Rate under Conventional Tillage Systems on a Clay Soil Using Artificial Neural Networks." World Automation Congress, Sep. 19-23, 2010, pp. 261-269 [retrieved on Mar. 1, 2014]. Retrieved from the Internet: <http://ieeexplore.ieee.org/stamp/stamp.jsp?tp=&arnumber=5665489>.

(Continued)

*Primary Examiner* — Hussein A. Elchanti
(74) *Attorney, Agent, or Firm* — Yee & Associates, P.C.

(57) ABSTRACT

A gas monitoring system on an agricultural implement such as a tractor or cultivator includes a nutrient applicator to inject chemicals or compounds into the soil. Although the soil generally covers over the chemicals or compounds, there still may be gases released into the atmosphere. The system includes a sensor that detects the gas phase of the chemicals or compounds. The system is also set up to generate an indication when a concentration of the gas passes a threshold. If the concentration of the gas in the atmosphere is too high, an alarm may sound or flash, or the release of the chemicals or compounds is reduced or ceased.

20 Claims, 8 Drawing Sheets

(56) References Cited

U.S. PATENT DOCUMENTS

| | | | |
|---|---|---|---|
| 8,356,563 | B2 | 1/2013 | Schaffert et al. |
| 8,410,945 | B2 | 4/2013 | Breed |
| 2002/0117095 | A1 | 8/2002 | Allan et al. |
| 2011/0174893 | A1* | 7/2011 | Allan .................. A01C 15/122 239/8 |
| 2013/0325242 | A1* | 12/2013 | Cavender-Bares .. A01C 21/002 701/25 |
| 2014/0070943 | A1 | 3/2014 | Breed |
| 2014/0116735 | A1* | 5/2014 | Bassett ................ A01B 61/044 172/2 |
| 2014/0361097 | A1* | 12/2014 | McLain .................. B05B 12/12 239/11 |
| 2015/0075299 | A1* | 3/2015 | Riess ....................... G01N 1/02 73/863.21 |

FOREIGN PATENT DOCUMENTS

| | | |
|---|---|---|
| EP | 0370593 B1 | 11/1994 |
| WO | 2009021272 A1 | 2/2009 |

OTHER PUBLICATIONS

Bremner, J. M. and Keeney, D. R. "Determination and Isotope-Ratio Analysis of Different Forms of Nitrogen in Soils: 3. Exchangeable Ammonium, Nitrate, and Nitrite by Extraction-Distillation Methods." Soil Science Society of America Journal, 1966, vol. 30, No. 5. [online abstract]. [Retrieved on Feb. 13, 2014]. Retrieved from the Internet: <https://dl.sciencesocieties.org/publications/ssaj/abstracts/30/5/SS0300050577>. <DOI:10.2136/sssaj1966.03615995003000050015x>.

De Baerdemaeker, J.; Munack, A.; Ramon, H.; and Speckman, H. "Mechatronic Systems, Communication and Control in Precision Agriculture." Institute of Electrical and Electronics Engineers Control Systems Magazine, Oct. 2001, vol. 21, No. 5, pp. 48-70 [retrieved on Mar. 2, 2014]. Retrieved from the Internet: <http://ieeexplore.ieee.org/stamp/stamp.jsp?arnumber=954519>. <DOI: 10.1109/37.954519>.

Erisman, J.; Bleeker, A.; Galloway, J.; and Sutton, M. "Reduced Nitrogen in Ecology and the Environment." Science Direct Environmental Pollution, 2007, vol. 150, No. 1, pp. 140-149 [retrieved on Dec. 16, 2014]. Retrieved from the Internet: <http://consensus.fsu.edu./fertilizer-task-force/pdfs/Erisman_Article.pdf>.

Falzon, G.; Lamb, D.; and Schneider, D. "The Dynamic Aerial Survey Algorithm Architecture and its Potential Use in Airborne Fertilizer Applications." Institute of Electrical and Electronics Engineers Journal of Selected Topics in Applied Earth Observations and Remote Sensing, Dec. 2012, vol. 5, No. 6, pp. 1772-1779 [retrieved on Mar. 3, 2001]. Retrieved from the Internet: <http://ieeexplore.ieee.org/stamp/stamp.jsp?tp=&arnumber=6125997>. <DOI:10.1109/JSTARS.2011.2179020>.

Gil, J. G.; Zarzuela, M. M.; Pernas, F. J. D.; Higuera, J. F. D.; Ortega, D.G.; and Giralda, D.B. "Dynamic Generation of Fertilizer maps Using GPS Technology." 10th Institute of Electrical and Electronics Engineers Conference on Emerging Technologies and Factory Automation, Sep. 2005, vol. 2, pp. 667-672 [retrieved on Mar. 1, 2014]. Retrieved from the Internet: <http://ieeexplore.ieee.org/stamp/stamp.jsp?tp=&arnumber=1612739>. <DOI:10.1109/ETFA.2005.1612739>.

Hou, X.; Wang, Y.; and Jiang, S. "Distribution of Soil Organic Carbon and Total Nitrogen of the Cultivated Layer under Different Tillage Practices." International Conference on New Technology of Agricultural Engineering, May 2011, pp. 664-668 [retrieved on Mar. 1, 2014]. Retrieved from the Internet: <http://ieeexplore.ieee.org/stamp.jsp?tp=&arnmber=5943886&tag=1>. <DOI:10.1109/ICAE.2011.5943886>.

Jalal, A. H.; Roy, S.; and Ahad, M. A. "Comparative Analysis of the Performance of Polymer Based Opto-chemical Sensor in Detecting Ammonia in Diverse Mediums." Proceedings of the Institute of Electrical and Electronics Engineers Southeastcon, Apr. 2013, pp. 1-4 [retrieved on Mar. 2, 2014]. Retrieved from the Internet: <http://ieeexplore.ieee.org/stamp/stamp/jsp?tp=&arnumber=6567407>. <DOI:10.1109/SECON.2013.6567407>.

Jeppiaar. "Scope and Consequence of Fertilizer on Global Emissions and its Effect on Climate Change." Recent Advances in Space Technology Services and Climate Change, Nov. 2010, pp. 1-6 [retrieved on Mar. 2, 2014]. Retrieved from the Internet: <http://ieeexplore.ieee.org/stamp/stamp.jsp?tp=&arnumber=5712788>. <DOI:10.1109/RSTSCC.2010.5712788>.

Manap, H.; Dooly, G.; Muda, R.; O'Keeffe, S.; and Lewis, E. "Cross Sensitivity for Ammonia Detection in Ultra Violet Region Using an Optical Fibre Sensor." Third International Conference on Sensor Technologies and Applications, Jun. 2009, pp. 75-81 [retrieved on Mar. 2, 2014]. Retrieved from the Internet: <http://ieeexplore.ieee.org/stamp/stamp.jsp?arnumber=5210951>. <DOI:10.1109/SENSORCOMM.2009.19>.

McGinn, S. M. and Janzen, H. H. "Ammonia Sources in Agriculture and Their Measurement." Canadian Journal of Soil Science, 1998, vol. 78, No. 1, pp. 139-148 [retrieved Feb. 13, 2014]. Retrieved from the Internet: <http://pubs.aic.ca/doi/pdf/10.4141/S96-059>.

Moos, R.; Mullera, R.; Ploga, C.; Knezevica, A.; Leyeb, H.; Irionb, E.; Braun, T.; Marquardtc, K.; and Binder, K. "Selective Ammonia Exhaust Gas Sensor for Automotive Applications." Sensors and Actuators B: Chemical, Mar. 2002, vol. 83, pp. 181-189 [retrieved Feb. 13, 2014]. Retrieved from the Internet: <http://www.sciencedirect.com/science/article/pii/S0925400501010383>. <DOI:10.1016/S0925-4005(01)01038-3>.

"Putting Down Fertilizer With the Planter." No-Till Farmer Blog, Lessiter Publications, posted May 6, 2011 [retrieved Mar. 20, 2014]. Retrieved from the Internet: <http://www.no-tillfarmer.com/ntf-blog/312/putting-down-fertilizer-with-the-planter/>.

Reidy, B.; Rhim, B.; and Menzi, H. "A New Swiss Inventory of Ammonia Emissions from Agriculture Based on a Survey on Farm and Manure Management and Farm-Specific Model Calculations." Science Direct Atmospheric Environment, May 2008, vol. 42, No. 14, pp. 3266-3276 [retrieved Jan. 23, 2015]. Retrieved from the Internet: <http://www.sciencedirect.com/science/article/pii/S1352231007003780>. <DOI:10.1016/j.atmosenv.2007.04.036>.

Rouveure, R.; Monod, M.; Faure, P.; and Chanet, M. "A Microwave Sensor for Agricultural Implements." Institute of Electrical and Electronics Engineers Geoscience and Remote Sensing Symposium, 2002, vol. 5, pp. 3020-3022 [retrieved Mar. 1, 2014]. Retrieved from the Internet: <http://ieeexplore.ieee.org/stamp/stamp.jsp?tp=&arnumber=1026856>.

Shao, L. and Wang, X. "Variable Rate Fertilizer Distributor in Precision Farming Based on PLC Technology." Fourth International Conference on Fuzzy Systems and Knowledge Discovery, Aug. 2007, vol. 4, pp. 209-213 [retrieved Mar. 2, 2014]. Retrieved from the Internet : <http://ieeexplore.ieee.org/stamp.jsp?arnumber=4406383>. <DOI 10.1109/FSKD.2007.606>.

Sommer, S.G.; Schjoerring, J. K.; and Denmead, O. T. "Ammonia Emission from Mineral Fertilizers and Fertilized Crops." Advances in Agronomy, 2004, vol. 82, pp. 557-622 [online abstract] [retrieved Feb. 13, 2014]. Retrieved from the Internet: <http//www.sciencedirect.com/science/article/pii/S0065211303820084>. <DOI:10.1016/S0065-2113(03) 82008-4>.

Timmer, B.; Olthuis, W.; and Berg, A. "Ammonia Sensors and Their Applications—a Review." Sensors and Actuators B: Chemical, 2005, vol. 107, No. 2, pp. 666-677 [retrieved Dec. 16, 2014]. Retrieved from the Internet: >http://apachepersonal.miun.se/~gorthu/Sensor/chap8/ammoniasensorsandtheir.pdf>. <DOI: 10.1016/j.snb.2004.11.054>.

"TRANSCAER® Anhydrous Ammonia Training, Anhydrous Ammonia Properties." The Fertilizer Institute and the American Chemistry Council, Inc., 2011, pp. 1-24 [retrieved Mar. 17, 2014]. Retrieved from the Internet: <http://www.transcaer.com/docs/AATour/Transcaer_Ammonia_Training_Student_Handout_rev04.pdf>.

Wang, R.; Zhang, Y.; Huang, Y.; Wei, F.; Bai, X.; and Liu, E. "Mechanization of Deep Tillage and Mulching to Improve Soil Water Conent and Spring Maize Yield." International Conference on Electronic and Mechanical Engineering and Informaton Technol- (56) References Cited

OTHER PUBLICATIONS ogy, Aug. 2011, vol. 4, pp. 2098-2101 [retrieved Mar. 1, 2014]. Retrieved from the Internet: >http://ieeexplore.ieee.org/stamp/stamp.jsp?tp=&arnumber=6023514>. <DOI: 10.1109/EMEIT.201136023514>.

Wu, M. "Effects of Incorporation of Nano-carbon into Slow-released Fertilizer on Rice Yield and Nitrogen Loss in Surface Water of Paddy Soil." Third International Conference on Intelligent System Design and Engineering Applications, Jan. 2013, pp. 676-681. [retrieved on Mar. 2, 2014]. Retrieved from the Internet <http://ieeexplore.ieee.org/xpl/articleDetails.jsp?arnumber=6456743>. <DOI: 10.1109/ISDEA.2012.161>.

\* cited by examiner

SYSTEM AND METHOD TO MONITOR GASEOUS CONCENTRATIONS

RELATED APPLICATIONS

This disclosure claims the benefit of U.S. Provisional Patent Application Ser. No. 62/016,904, titled "System and Method to Monitor Gaseous Concentrations," filed on Jun. 25, 2014, which is incorporated herein by reference in its entirety.

FIELD OF THE DISCLOSURE

This disclosure relates generally to embodiments of monitoring gases from the injection of chemicals such as into the soil.

BACKGROUND OF THE DISCLOSURE

As Earth's population is now over seven billion people and increasing rapidly, more food and natural resources are needed. Use of fertilizer and manure (or pesticides) would help increase crop yield and thus the amount of food. Fertilizer consumption depends on factors such as the choice of crops or forest plants, varieties and qualities of seeds, geography, rainfall, irrigation patterns, soil quality, farming methods, and sprayer and tillage technology and information. Although this disclosure is not limited to nutrients or even nitrogenous fertilizers, solutions or gases such as ammonia are familiar to most people with its pungent odor when the concentration of ammonia is high enough (over 50 ppm in air). Ammonia can be used in a reaction with carbon dioxide to produce urea. Ammonia nitrate can be produced through the combination of ammonia and nitric acid. Other fertilizer types produced on the base of ammonia include calcium ammonium nitrate (ammonium nitrate mixed with ground dolomite) and NP/NPK compound fertilizers.

In an agricultural setting, the liquid or semi-liquid (gas) state of these fertilizers or nutrients may be sprayed close to the soil or applied directly into the soil by an applicator mechanism. A sharp ground-engaging tool such as a shank or disk first cuts through the ground and creates a furrow into which the compounds are subsequently deposited. Compounds like liquid anhydrous ammonia ($NH_3$) with a low boiling temperature point evaporate quickly and their fumes may linger in the air. There may also be tank leakages of ammonia compounds. Beginning at levels between 25-50 ppm, the fumes may cause some irritation. An end-user may not know when the gas in the atmosphere becomes a problem. Farmers also operate in a noisy environment that includes much vibrational motion (e.g. the tractor moving across uneven soil) where the compounds may be spread somewhat unevenly or in unpredicted parts of the soil.

SUMMARY OF THE DISCLOSURE

Embodiments of an agricultural or forestry implement include a ground engaging mechanism to introduce the chemicals or compounds into the soil and then a mechanism to detect the vapors emitted by the chemicals and to respond to an alarm condition. There is a vapor monitoring system for an agricultural implement, where the system includes a nutrient applicator that injects a compound into soil. Directly or indirectly above the nutrient applicator, there is a sensor that detects a gas corresponding to the compound in the soil. The vapor monitoring system is set up to generate an indication when a concentration of the gas passes a threshold. In some embodiments of an alarm state, the monitoring system generates an auditory or visual warning. In other embodiments, the monitoring system reduces or shuts down the release of the chemicals when there is an alarm condition. Yet other embodiments are described in the detailed description, drawings and claims.

BRIEF DESCRIPTION OF THE DRAWINGS

The details of one or more implementations are set forth in the accompanying example drawings and the description below. Other features and advantages will be apparent from the description and drawings, and from the claims.

DETAILED DESCRIPTION

Nutrient (or pesticides) applicators inject compounds into the ground such as for agricultural purposes. In this disclosure, rather than try to monitor the nutrient (or pesticides) content in the soil, sensor apparatuses are mounted on the ground engaging implements to analyze the air above the soil and to detect volatilization of certain nutrients and fertilizers. Sensors are placed in strategic locations on an agricultural implement or vehicle. The sensors and associated electronics and software have a detection threshold based on a plume model (e.g. hydrodynamic movement of gas) or based on fixed thresholds or based on calculations. For example, if the measured atmospheric concentration of a gas such as anhydrous ammonia ($NH_3$) or methane during a ground engaging operation exceeds a threshold value, an alert indication (e.g. sound, flash, haptic technology) is generated. The application and detection of atmospheric anhydrous ammonia is described as an example, but the embodiments also apply to other chemicals or compounds that vaporize, even when toxicity is not an issue. For instance, the embodiments may be used as an alternative and fast way of measuring certain nutrients in the ground without having to take soil samples. The embodiments solve technical problems such as being able to measure with sufficient accuracy. The embodiments have attributes such as not being disturbed by weather conditions (e.g. wind) or machine motion and vibration, be simple and cost effective to implement and to use and maintain or calibrate, and be easy to integrate into existing machinery such as tractors and other vehicles.

If the applied substance is anhydrous ammonia, it is usually directly injected as a crystal, liquid, semi-liquid into the ground before or after planting. Although soil is placed over the ammonia to prevent it from escaping, some of the liquid or semi-liquid tends to still escape as an aerosol or gas. The speed of vaporization and dispersion of the aerosol and gas depend on environmental factors such as the wind, weather (e.g. amount of humidity and temperature), and on terrain conditions on the downwind direction. For instance, cold temperatures tend to cause the vapors or cloud to remain close to the ground and slow the cloud dispersion; while warm air adds energy to the ammonia molecule, thus spreading it faster and creating a larger plume. Or, high wind tends to stream out the release, and moderate wind tends to maximize dispersion, especially if the upper air is warm. Consequently, sensing the gas and its concentration also entails calibration and normalization of the results depending on the environmental and physical conditions.

Figure 1:
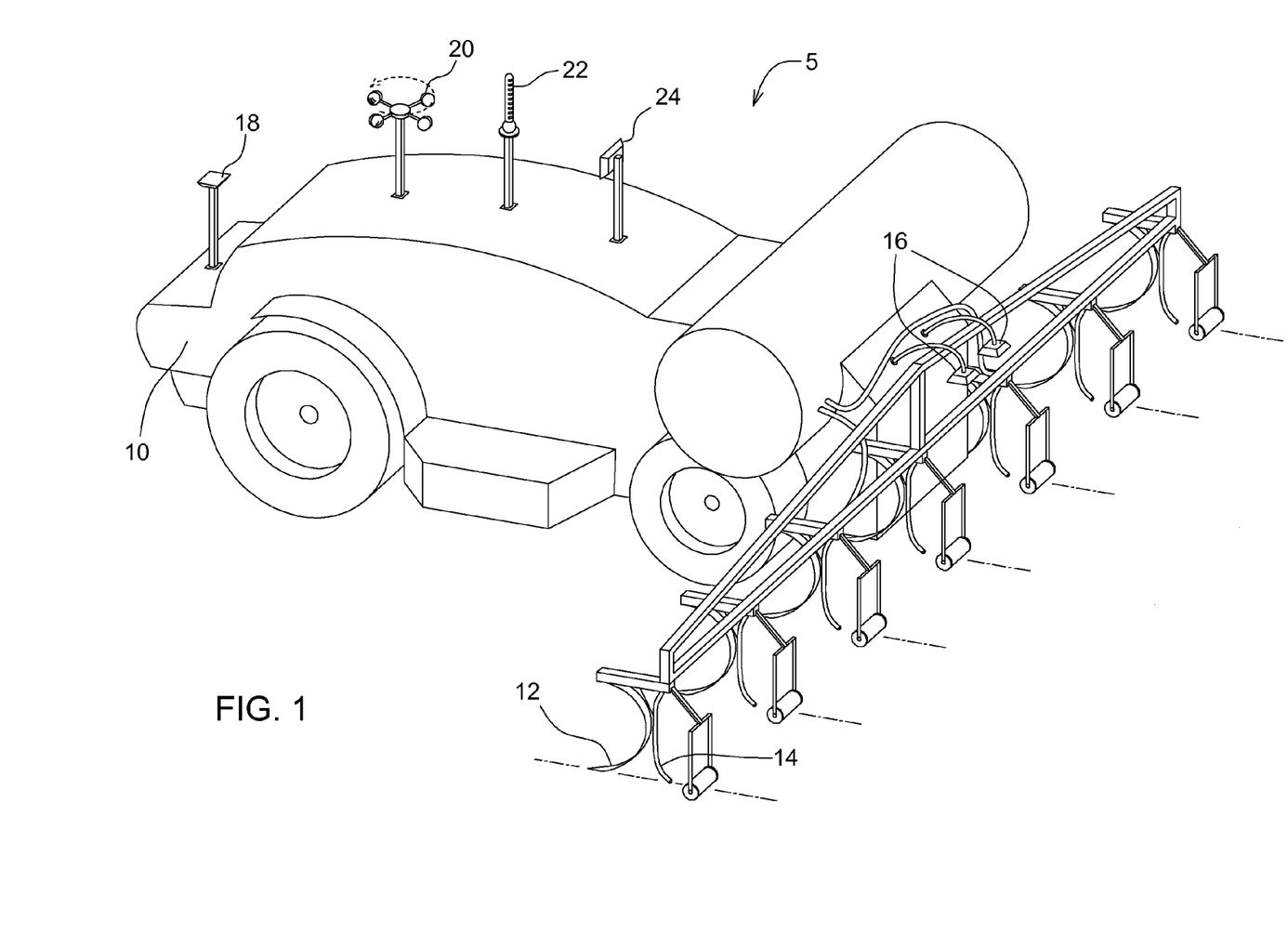
FIG. 1 depicts an example embodiment of a compound application system having gas sensing capabilities.

In one embodiment, FIG. 1 depicts an example implement such as a compound application system 5 having a motorized, unmanned or autonomous vehicle 10 attached to a ground engaging tool 12 followed by another implement such as a compound applicator 14 at the rear end of the engaging tool 12. The autonomous vehicle 10 has a location sensor 18 (e.g. GPS/GNSS, camera, infrared), a wind sensor 20 (e.g. direction and speed), and an atmospheric sensor mounted (e.g. thermometer, barometer, humidity) near the upper front of the vehicle 10. Alternatively, precise mobile weather sensor stations are mounted on the equipment or vehicles having compound applicators. A gas sensor 16 is mounted at the upper rear of the autonomous vehicle at either fixed locations or at moveable or variable locations (e.g. on a rotatable rod). The compounds that are applied to the ground are, for example, chemical compounds, liquids, solids, or mists. In another embodiment, there is no ground engaging tool 12 for a no-till application or if the soil is already porous or opened enough to accept the compounds. The compound application system 5 has a device alert 24 such as a loudspeaker, a red light, vibration, blinking computer widget or some other device to provide a warning that a gas concentration in the atmosphere is too high or is at a dangerous level. In FIG. 1, the alert 24 is mounted on the vehicle 10. Alternatively, alert 24 is mounted near the gas sensor 16 so that the entire vapor monitoring system (e.g. alert 24, electronics and software and controller) is congregated near the gas sensor 16. On the other hand, if the software and electronics of the gas monitoring is performed remotely, the alert 24 is located at a remote computer or central computing unit 120. In FIG. 1, the applied material is located in a tank mounted on vehicle 10, but may also be towed in a separate tank. The vehicle 10 may also be driven by an operator.

Figure 2:
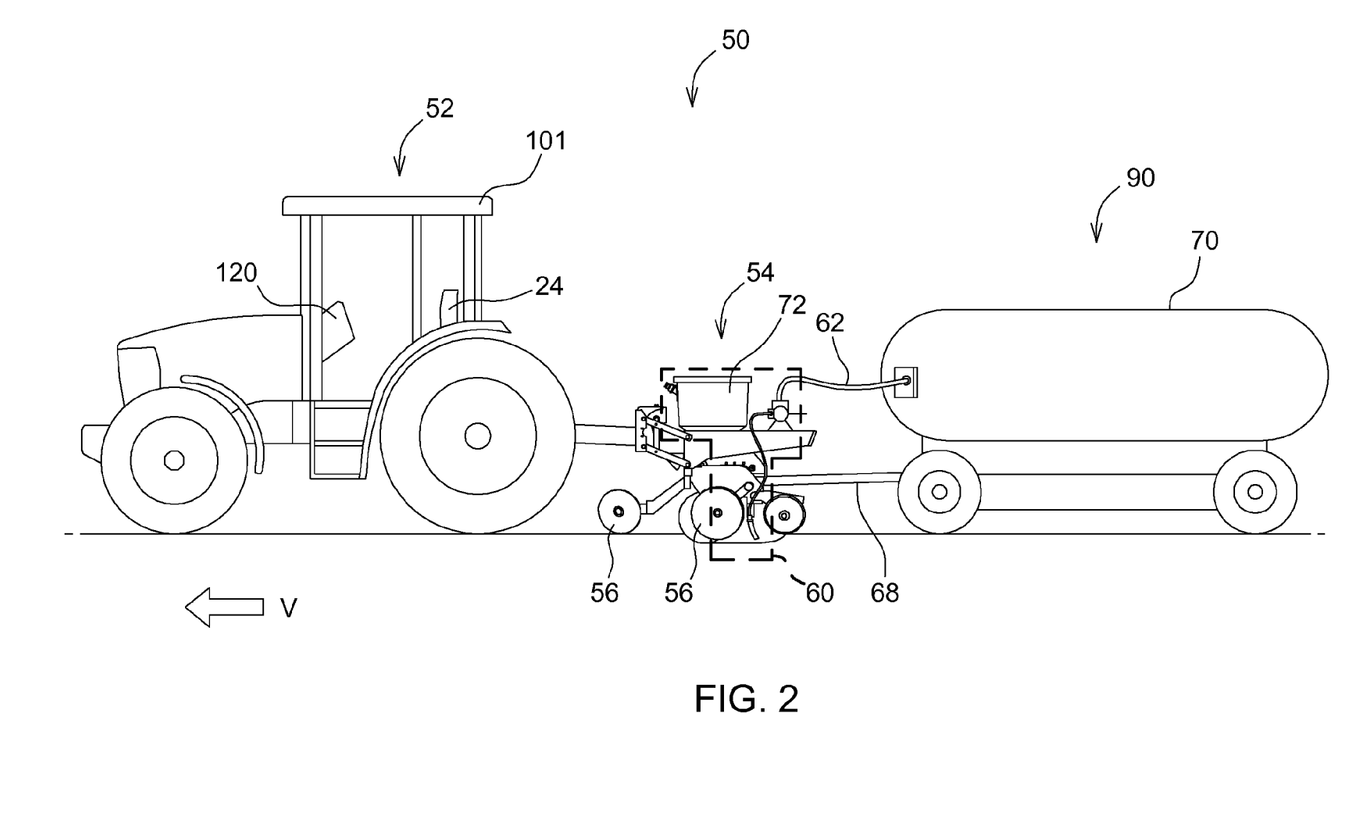
FIG. 2 depicts an example embodiment of an agricultural assembly having compound application and gas sensing capabilities.

FIG. 2 depicts another agricultural embodiment (e.g. forest, crop, winery) of the compound application system 5, agricultural assembly 50, to apply a nutrient such as anhydrous ammonia on an agricultural field (e.g. crops, forest, etc.). Alternatively, some pesticides may also be applied similarly in the following described manner. The agricultural assembly 50 has a manned or unmanned tractor 52 that pulls an agricultural implement or vehicle such as a field cultivator 54 (shown in greater detail in FIG. 3). At the underside of the field cultivator 54, there are soil opening tools 56 such as coulters, disks or shanks that disturb and cut into the ground and create openings such as holes, slivers, slices, trenches or furrows in the soil. A nutrient applicator 60 is attached to and behind (or underneath) the field cultivator 54 with respect to the direction of travel of the agricultural assembly 50. The nutrient applicator 60 includes fingers or nutrient tubes 64 that direct nutrients into the soil. Although called a "tube," the nutrient tubes 64 are alternatively tubular, conical, funnel-shaped, syringe or some other dispenser shape that can accurately place nutrients in a small area (e.g. within 1-2 inches of a desired location). Each of the nutrient tubes 64 has a tube opening 66 where nutrients are dispensed into the soil (see e.g. FIG. 6). Also depending on the size and span-width of the tractor 52, more than one nutrient applicator 60 is attached to the rear of the tractor 52, either in the lateral direction (e.g. perpendicular to direction of travel) or in series such as when there are multiple types of nutrients that are not mixed together. In the example, agricultural assembly 50 has a rear hitch 68 to which heavy loads may be attached and pulled. For a fertilizer application, the load is a nutrient tank 70 that feeds nutrients into the nutrient applicators 60 via a feed duct 62. For instance, the nutrient tank 70 is a liquid anhydrous ammonia $NH_3$ tank 72. Alternatively, tank 70 is mounted on the tractor 52. Regardless where tank 72 is located, there are manifolds 74 (see e.g. FIG. 6, chambers or device with valves and outlets to distribute the nutrients) mounted on cultivator 54 that directs or re-directs compounds to the appropriate corresponding nutrient applicators 60. If the manifolds 74 did not initially contain the compounds, the $NH_3$ tank first releases the compounds to the manifolds 74 that hold the compounds temporarily before releasing them into the nutrient tubes 64 and then into the soil.

In other configurations of an agricultural assembly 50, the nutrient applicator 60 follows a field planter or seeder or no-till air drill (not shown) that puts seeds into selected positions in rows of soil and covers the seeds with soil. In this configuration, the subsequent nutrient applicator 60 releases or sprays compounds near the seeds in a region adjacent to where the seeds are planted. Alternatively, for some compounds, the nutrient applicator 60 may also precede a field planter. The nutrient applicator 60 first injects the compound into the soil, which is then followed by seed planting. For example, in a no-till planter application, a compound of starter fertilizer and anhydrous ammonia are mixed together and put into tanks on the field planter and optionally also on a trailer towed behind the field planter. Through a coulter or disk having an associated nutrient dispenser, the compound is injected and placed near the seed (e.g. about 1-3 inches away from the seed). In these embodiments with field planters, both the fertilizer and seeds are effectively placed into the soil during one drive pass through the field. In any of these embodiments of the agricultural assembly 50, there is also a gas detector system 100.

Figure 3:
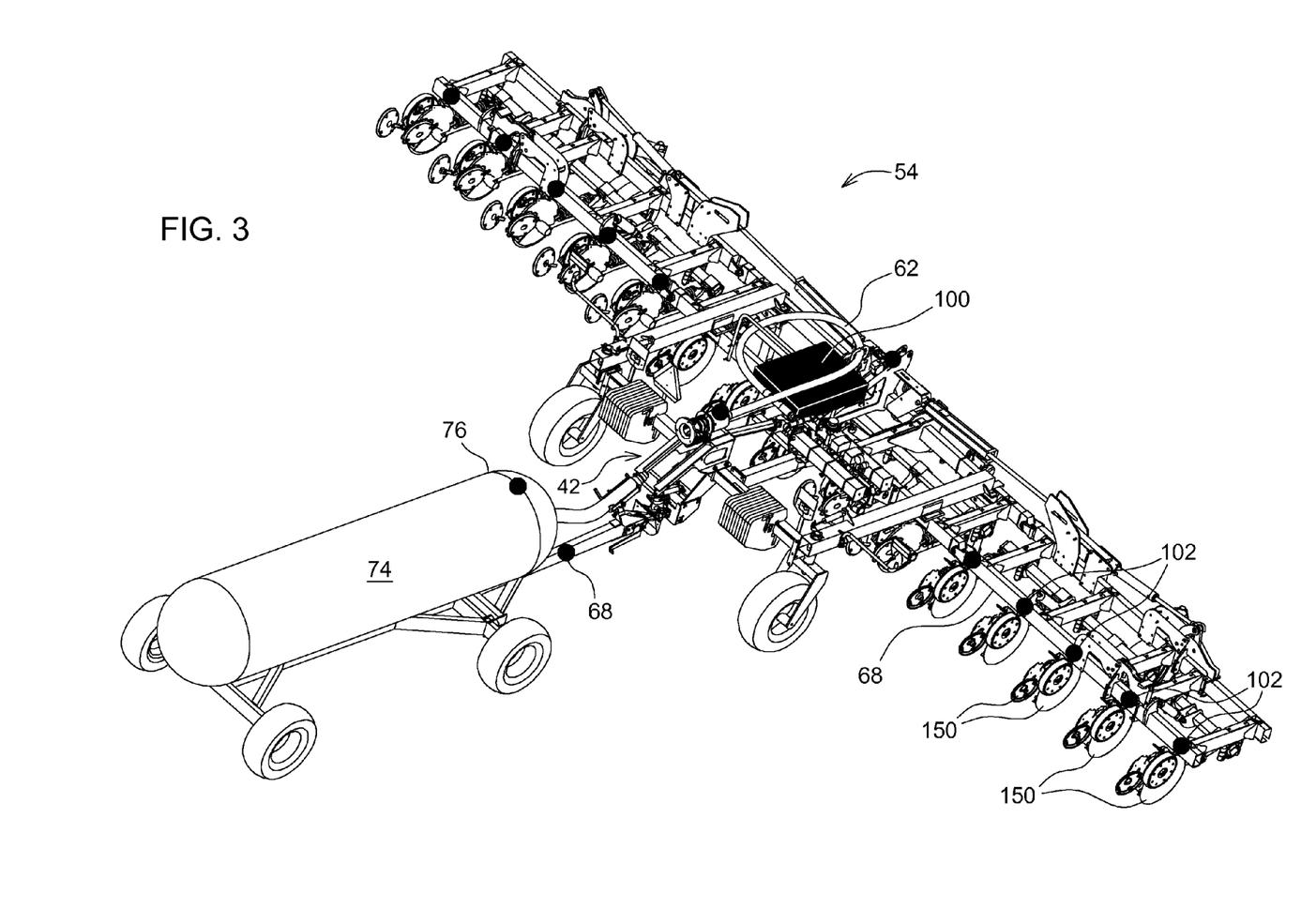
FIG. 3 depicts example details of a magnified drawing of a soil cultivator having compound application and gas sensing capabilities.

In FIG. 3, an example gas detector system 100 is mounted to the agricultural assembly 50. The gas detector system 100 includes for example, NH3 or other types of gas sensors 102. For monitoring the gas from the ground, the detector system 100 is located generally above the nutrient applicator 60 (not shown) in FIG. 3, but located between and ahead of a pair of closing disks 150 with respect to the direction of travel. The detector system 100 is either directly or indirectly above the nutrient applicator 60, such as behind and above the nutrient applicator 60 at an angle (0-80 degrees from vertical). For more general monitoring (e.g. if the NH3 tank 74 has a spill or leak), the gas sensor 102 can be mounted anywhere near a source of the anhydrous ammonia. In a different embodiment, the location of the detector system 100 is mechanically adjustable in order to optimally sense the gas, to adapt to the environmental factors or terrain factors (e.g. hill or flat plain) that may cause the vapors from the fertilizer to remain closer or farther from the ground or follow the wind direction. For example, the gas sensor 102 is attached to a magnet or fastener and can be readily re-located anywhere near the anhydrous NH3 source as conditions change or a need arises. Alternatively, the detector system 100 is on a rotatable plate or fixture that is fixed in location via nuts, bolts, epoxy, etc., but the detector system's 100 location and orientation are adjustable automatically through computer-control.

In some embodiments, the gas sensors 102 are mounted on the rear hitch 68 to which nutrient applicators 60 are tied (ahead of each pair of closing disk 150). Alternatively, the gas sensors 102 are strapped or mounted to a brace 76 for the NH3 tank 74. Since the anhydrous ammonia is volatile and temperature monitored, its temperature is kept within a certain range by a NH3 cooler (not shown) that is often located near the bottom (or underside) of the NH3 tank 64. The gas sensors 102 can also be mounted in the front and back of the NH3 cooler. Since there are often multiple gas sensors 102, they can be temporarily mounted to many locations, on the tractor 52, on a cart for the NH3 tank 64, and so on. Moreover, to quantitatively monitor the effectiveness of a nutrient application for each row of plants or crops, each finger (e.g. nutrient tube 64) of the nutrient applicator 60 is associated with a gas sensor 102. More specifically, an agricultural assembly 50 or field cultivator 54 has a row of or multiple soil opening tools 56 followed by corresponding nutrient applicators 60, although for simplicity, the figures depict only a single finger (e.g. nutrient tube 64) of the nutrient applicator 60. For such configurations, depending on how far apart the nutrient tubes 64 or multiple nutrient applicators 60 are located, there is a single corresponding gas sensor 102 for each nutrient tube 64 or each nutrient applicator 60 or a shared gas sensor 102 for a number of nutrient tubes 64 or nutrient applicators 60. An optimal number of gas sensors 102 is determined a priori through field tests under various environmental and equipment configurations suitable for a field or fields in a particular region that may have similar soil and crops or vegetation. For example for plume cone calculations, multiple sensors 102 are placed at locations around the periphery where the cone is predicted to form.

Figure 4:
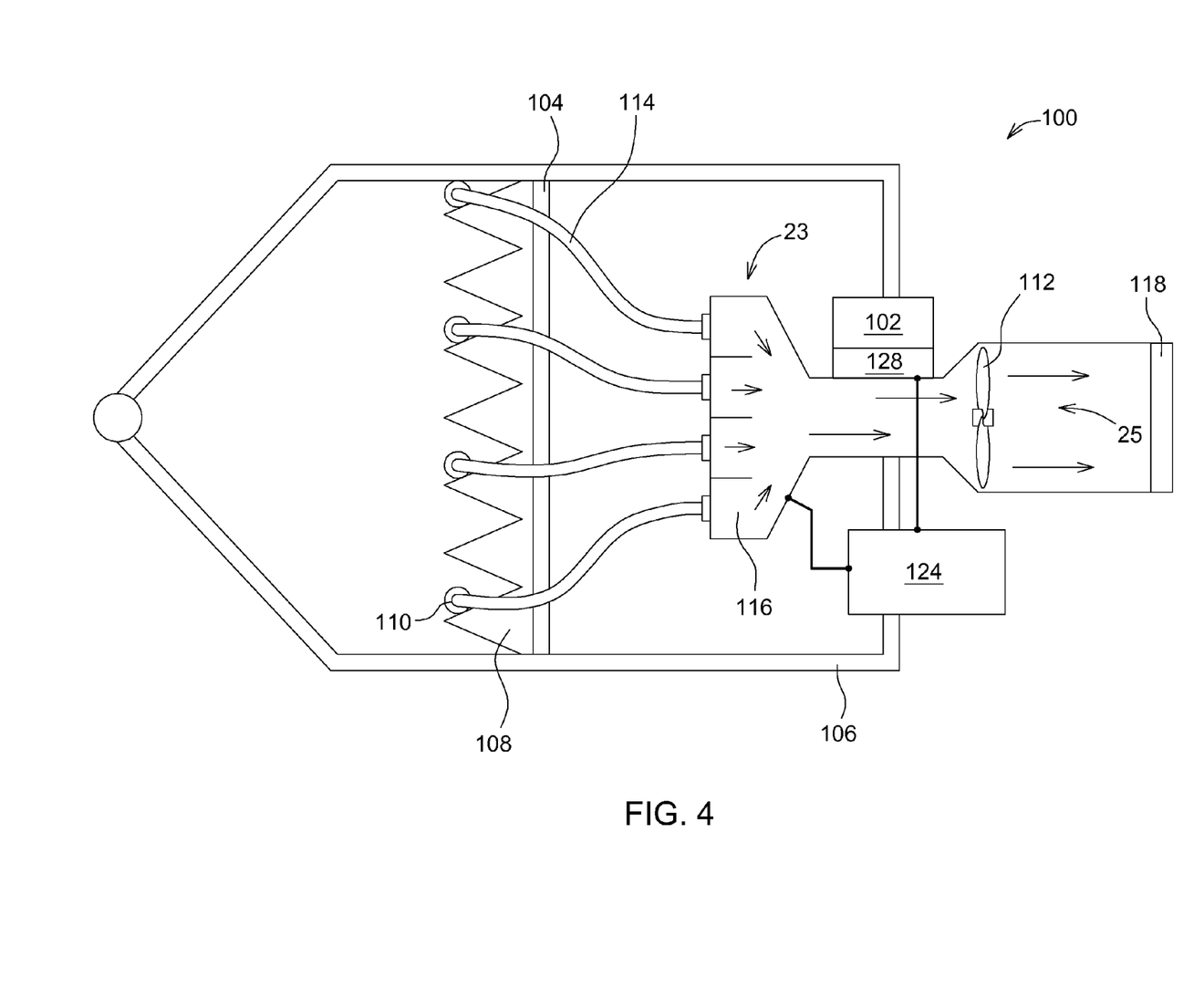
FIG. 4 depicts an example embodiment of an arrangement of a nutrient applicator and gas detector.

FIG. 4 depicts another example detector system 100 mounted on the field cultivator 54 or other part of the agricultural assembly 50. There is at least one gas sensor 102 mounted on each rank 104 of the cultivator 54 to monitor the gas escaping in that lateral row (transverse to the direction of travel). In this example, the gas sensor 102 is mounted on the cultivator frame 106. In other embodiments, there may be more than one gas sensor 102 for each ground engaging tool 108. The gas sensor 102 sends its data and any computational results to a detector computing unit 124. The design choice for the configuration of the detector system 100 depends on a variety of factors such as the cost of the gas sensors 102 relative to the desired spatial and temporal granularity of the data collected. In some embodiments, a single gas sensor 102 collects data for several rows. In the example of FIG. 4, there are seven ground engaging tools 108 and four inlet samplers 110 for gas sensor 102. Each inlet sampler 110 is located near (5-20 inches) the tube opening 66 of nutrient tubes 64 (not shown, underneath ground engaging tool 108. Corresponding to each inlet sampler 110 is a gas flow tube 114, one end of which is connected to the particular inlet sampler 110. The other end of the gas flow tube 114 connects and inputs to valves 116 that feed gas flow into the gas sensor 102. The liquid flow tubes 114 are made of flexible material such as rubber, plastic or malleable metal. Opposite the direction of travel, behind the gas sensor 102, a fan 112 is mounted on frame 106. In operation, for the configuration of FIG. 4, the detector computing unit 124 optionally selects which gas flow tube 114 completes the pneumatic circuit. The fan 112 draws air through the set of gas flow tubes 114 past gas sensor 102. Air is induced (sucked) into gas flow tubes 114 from the vicinity of the inlet samplers 110, past gas sensors 102, through fan 112, and then discharged through an outlet 118. Through multiplexing, detector computing unit 124 selectively collects data from another gas flow tube 114 and stores the data for subsequent computation of the level of any noxious gas. The configuration of FIG. 4 improves the spatial resolution of the data collected for one gas sensor 102 and also permits averaging over the data collected or permits detection of a faulty channel (e.g. gas flow tube 114). Optionally, gas flow tubes 114 are equipped with an air or dust filter or filter for other materials to prevent fouling or blockage of the gas sensor 102.

Figure 5A:
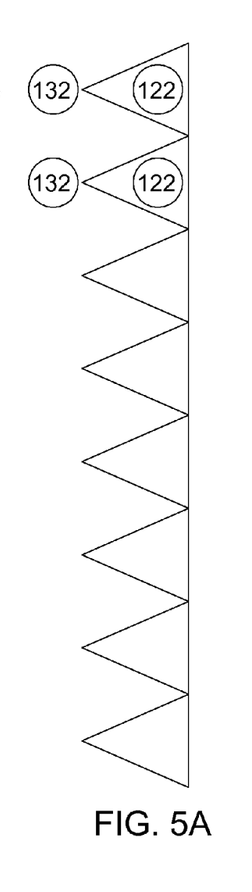
FIGS. 5A-5C depict other example embodiments of arrangements of a nutrient applicator and gas detector.
Figure 5B:
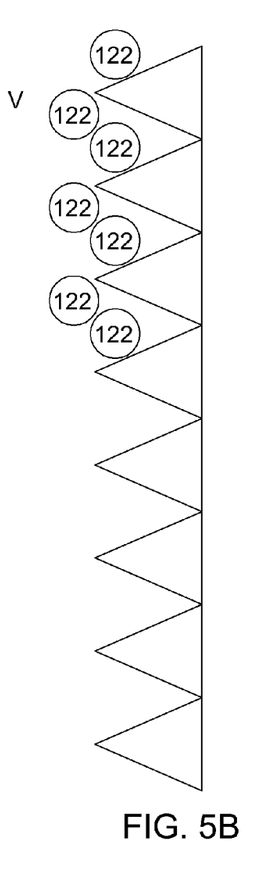
Figure 5C:
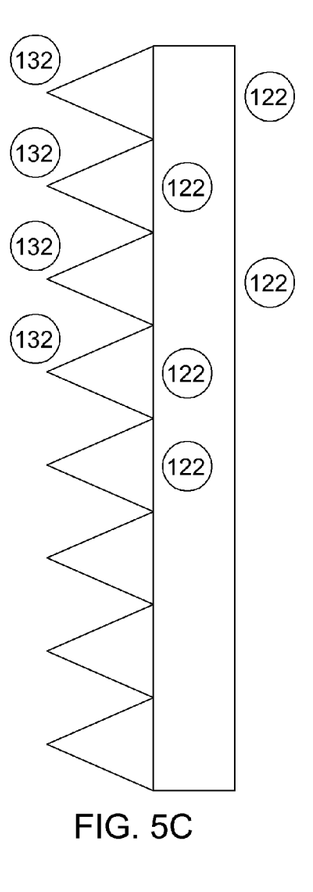

FIGS. 5A-5C depict other embodiments of the detector system 100 where gas flow is collected from all inlets simultaneously, rather than multiplex from one channel to another. In FIG. 5A, the inlet samplers 122 (or gas sensors 102) are positioned after the tube openings 132 of the nutrient tubes 64 (not shown on FIGS. 5A-5C), parallel to the direction of travel. In FIG. 5B, the inlet samplers 122 are positioned transverse to the direction of travel. In FIG. 5C, the inlet samplers 122 are staggered or placed in numerous positions located at or surrounding the tube openings 132. The patterns of FIGS. 5A-5C are useful to compensate for a gas pattern relative to the sensor for various directions of travel and wind conditions. The positions of inlet samplers 122 or gas sensors 102 are adjustable manually (e.g. re-attachment by magnetic material, adhesive, or mechanical fastener) or the multitude of devices are each pointed in different directions relative to one another so as to be able to catch the gas stream regardless of the changing direction of the vehicle 10. Alternatively, the inlet samplers 122 are plugged into a rotatable spindle mount or moveable sensor arms.

Turning now to embodiments of the gas sensors 102, a few companies make small gas monitors. For instance, PCE Instruments make hand-held battery-operated Gasman meters about 2-3 inches in length and width that have integrated electronics and alarms. The devices warn with a penetrating sound and an optical signal (useful in case when there are loud noises in the surroundings) of the existence of dangerous gas concentrations and show on a tablet or computer screen the value of the gas measurement. In addition the PCE gas meter is able to save measurements and transmit them wirelessly to a computer for evaluation. The Gasman can detect twelve gases, ammonia, sulfides, carbons (from about 0 to 100 ppm for ammonia) and the alarm is set at 25 ppm. For an agricultural application, the gas sensor 102 could include a less expensive form of the Gasman, to detect only one or a few gases and mounted to a magnet or fastener or a bolt so as to easily be placed near the nutrient tubes 64, rear hitch 68 or nutrient tank 72 or 74. Alternatively, gas sensor 102 includes smaller ammonia gas detectors about 1 inch by 1 inch in width and length such as those made by SOS Electronics, Sensidyne or Sierra Monitor. These monitors have an ion-selective electrode that converts the activity of a specific ion dissolved in a small amount of solution into an electrical potential, a voltage that can be amplified by an analog amplifier. The voltage depends on the ionic activity. The sensing part of the electrode is usually made as an ion-specific membrane, along with a reference electrode. The voltage is proportional to the concentration of the ions.

By careful calibration, these monitors can be adjusted to be sensitive to the 0-100 ppm level and also be mounted on magnets, fastener or a bolt for attachment purposes.

Another embodiment of the gas sensor 102 includes a Delphi ammonia sensor that detects ammonia within a range of 0 to 100 ppm. If the sensor detects too much ammonia, it signals the system to reduce the amount of the urea injection. The planar alumina substrate in the Delphi ammonia sensor combines an integral temperature sensor with a thick-film heater for optimum performance. The Delphi ammonia sensor provides measurement of ammonia without interference from other elements in the atmosphere. Yet another option for measuring NH3 concentration is to employ an engine exhaust nitric oxide sensors such as those manufactured by Continental. These sensors are sensitive to both nitric oxide and NH3. The sensors usually do not discriminate between the two molecules. Only trace amounts of nitric oxide usually exist in the atmosphere, thus allowing nitric oxide sensors to also be suitable for use in measuring NH3. The Delphi ammonia sensor is modified to mount on a magnet or fastener or bolt for easy placement on the agricultural assembly 50 or compound application system 5.

In various example embodiments, the gas sensors 102 are powered through electrical wire or locally via battery or energy harvesting. Energy sources include battery charging from operating the motor/engine of the autonomous or tractor 52. Alternatively, as sensors and supporting electronics become smaller and more efficient, the gas sensor 102 is wireless and powered through energy harvesting. One example of energy harvesting is solar power.

In some example embodiments, the gas sensors 102 (or 16) are wired or wireless for communications with the detector system 100 or with the autonomous, tractor 52, or even with a remote location. In the wired version, the gas sensors 102 have an electrically-wired (e.g. through CAN bus or some other vehicle bus standard) connection to a central processing unit 120 that is on the cab 101 of the tractor 52 (see FIG. 2). The central processing unit 120 includes an electronic computer along with analog trip circuits or threshold detectors; or analog to digital converters (ADC) followed by digital processing circuits such as a microprocessor, microcontroller, logic circuits, calculators, programmable devices, programmable logic units, arithmetic logic units, pattern recognition circuits, memory circuits and buffer circuits, and so on. In other embodiments, the gas sensors 102 have local computation capability through sensor logic unit 128 (e.g. FIG. 4) or the gas sensors 102 are in electrical communication with a detector computing unit 124 located in the detector system 100 but not physically attached to a gas sensor 102. These processor devices, the central processing unit 120, detector computing unit 124 or local sensor logic unit 128 have wireless or electrical communication (e.g. through CAN bus or separate wiring) with the alert 24 or the nutrient applicators 60 or feed ducts 62 to control them in the event of an alarm situation where the concentration of a gas exceeds a tolerated threshold. For instance, the alert 24 flashes or sounds a warning, and/or the application of the chemical or compound is reduced or ceased.

In an embodiment where the communications are performed wirelessly, for example, connections to a central processing unit 120 that is on the cab 101 of the tractor 52 are based on wireless protocols (e.g. 802.11 WIFI or 802.15.1 Bluetooth). Together with computations and analysis, central processing unit 120 is set up as a local wireless hotspot having a wireless transmitter and receiver or an integrated mobile router. By adding a wireless transmitter and receiver to a controller for the nutrient applicator 60 and to the sensor logic unit 128 for the gas sensors 102, these devices would have to ability to communicate with the central processing unit 120 or among themselves. Alternatively, even on a single tractor 52 itself, there may exist both wireless and wired communication among the different devices on the tractor 52 or agricultural assembly 50. There are other ways to partition the communication system that would be apparent to one of ordinary skill in the art. For instance, if the central processing unit 120 is not on the tractor 52, but in a remote location such as the farmhouse, there may already exist a WIFI router at the house that can perform the functions of a hub or hotspot, integrate and transfer all the communication information, for example, from one tractor 52 to another object. In yet another embodiment, there are additional tractors or agricultural assemblies operating in the field and people on those tractors may be alerted when there is a gas concentration alarm. For these remote communications, wireless or radio communication is used. In another embodiment, gas sensors 102 are monitored and managed by an external source so that information can be downloaded and uploaded from the sensors 102. New thresholds are sent to the gas sensors 102 to adapt them to changing conditions or sensors 102 are able to send signals to other sensors.

In embodiments where the compound application system 5 injects organic waste (e.g. manure) or sludge, the amount of detected ammonia or methane is proportional to the odor from the sludge. In the event the aggregate amount of methane detected is too high, the injection rate is decreased to keep odors within acceptable limits. Similarly, if the methane level is low, the injection rate may be increased subject to other control constraints and parameters such as a nutrient (e.g. phosphorus) or salt application rate. Such manure or sludge sensor is made by Delphi, among others.

Figure 6:
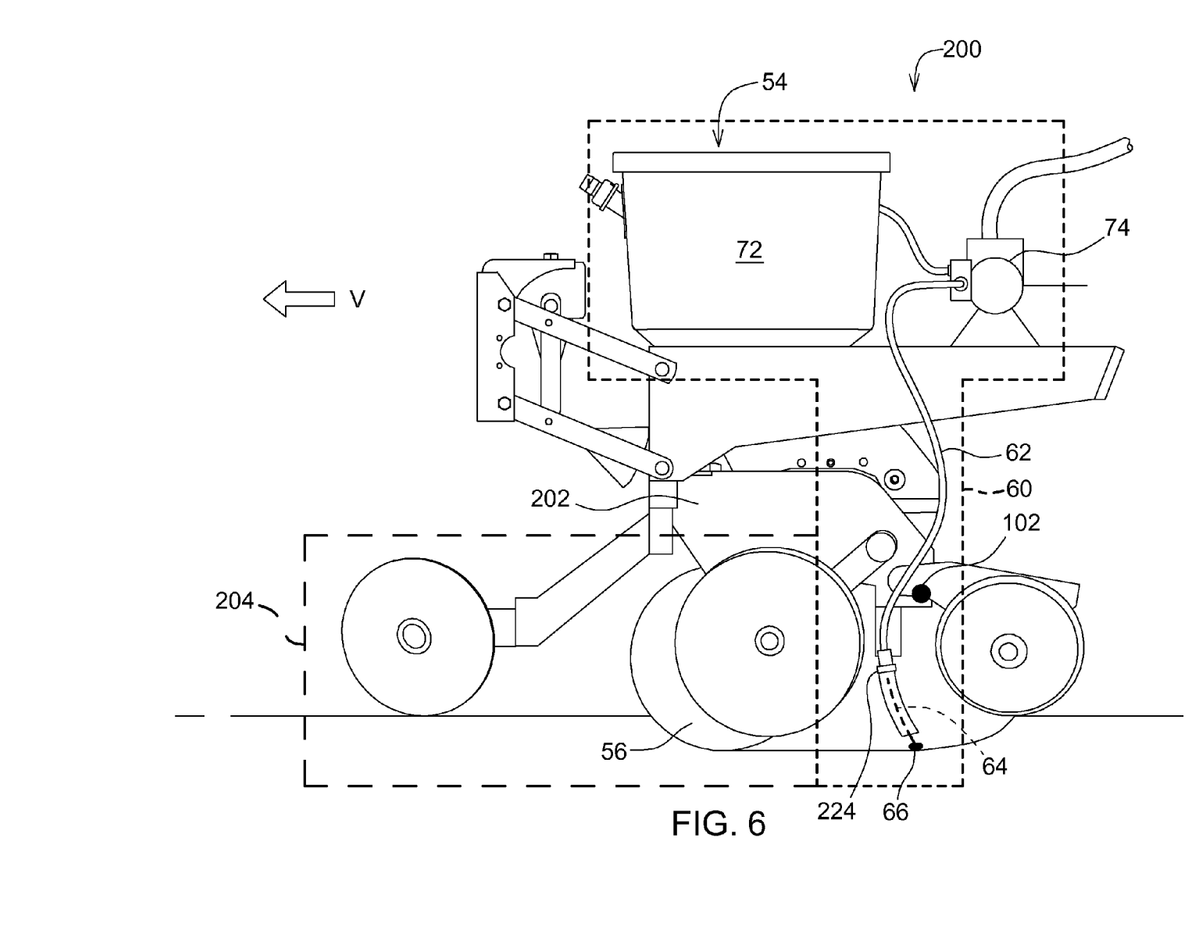
FIG. 6 depicts an example embodiment of an arrangement of ground engaging tool, nutrient applicator and gas detector.

FIG. 6 depicts a close up view of an arrangement of the gas sensors 102 near a fertilizer (or pesticide) opener assembly 200. Assembly 200 includes a frame 202 carrying a soil opener 204 for opening a trench in the soil in which one or more selected fertilizer types are deposited (e.g., dry, liquid and/or gaseous fertilizer). Soil opener 204 includes an opener disc 56 and fertilizer dispensers 224. Frame 202 includes a linkage that is biased in a downward direction with a compression coil spring. A depth adjuster (e.g. pin lock or bolts) moves the vertical orientation of the opener disc 56 to adjust the cutting depth of opener disc 56 into the soil. Likewise, the height of the fertilizer dispensers 224 is also adjustable so that nutrients are embedded into the soil at different depths. Accordingly, a height or position of a corresponding detector system 100 or gas sensors 102 is also adjusted either automatically (e.g. if the detector system 100 is mounted on a moveable arm or ledge that is in electrical communication with the tractor controller) or adjusted by human operator manually free of tools (e.g. velcro, magnet, fastener).

Another possible sensor 102 is available as an integrated circuit such as a micro gas chromatograph formed as an on-chip device. Its separation column, where the gas interacts with a polymer coated on the interior walls, is about the size of a quarter, and the thermal conductive detector is about half the size of a penny. When the two are combined, the combination device is about the size of a small rectangular 9-V battery. Such small sensors 102 and corresponding integrated circuitry are clipped or attached to some part of the agricultural implement such as a cultivator, primary and secondary tillage tools (e.g. rippers, plows, disks, etc.), or to the tractor 52 and cab 101 or hood of the tractor 52, to where noxious gas may travel.

In some embodiments, in addition to the gas sensors 102, there are other sensors onboard a tractor 52 or vehicle 10 such as depicted in FIG. 1; additional information is analyzed in determining an over-gas condition. The path of a gas from the ground to the gas sensors 102 will be impacted by the velocity (speed and direction) of the tractor 52 relative to the velocity of the surrounding atmosphere (wind). A local wind sensor (e.g. 20) and other atmospheric sensors 22 are mounted on the front of the autonomous vehicle 10 or tractor 52. Alternatively, weather data is obtained wirelessly from local weather stations in a way similar to weather-band radio or on cellular phones. Information about the velocity, position and orientation of the tractor 52 is obtained from a variety of instruments on the tractor 52; it has accelerometers, gyroscopes and GNSS/GPS receivers (not shown). Then, the directional information about tractor 52 and information about the wind velocity are input to the detector computing unit 124 to aid in the selection of which gas sensors 102 or inlet sampler 110 to use so that the direction for detecting a gas is optimal.

Both the gas sensor 102 (or 16), or an inlet to the gas sensor 102 may be moved or rotated to provide an optimal presentation to the gas such as directly facing an oncoming gas plume. Changes in the orientation is achieved through a pan-tilt mount (not shown), such as for cameras. In another example, at least one sensor 102 is rotated or moved to different locations in order to be in a better position to measure the release of gases depending on the nature of the terrain, the climate, wind direction and so on. Further the monitoring location can be extended by attaching the sensor 102 on an end of a rotatable rod or disk, thus extending the reach of the sensor 102.

In some example embodiments, the fixed and movable gas sensors 102 are positioned to support either monitoring gas escape from the ground or monitoring and localizing an equipment problem such as a broken coupling or disconnected hose. Further, gas sensor 102 can also monitor the soil directly for a moisture content of the soil and the percentage of anhydrous ammonia in the moisture or vapor.

Figure 7:
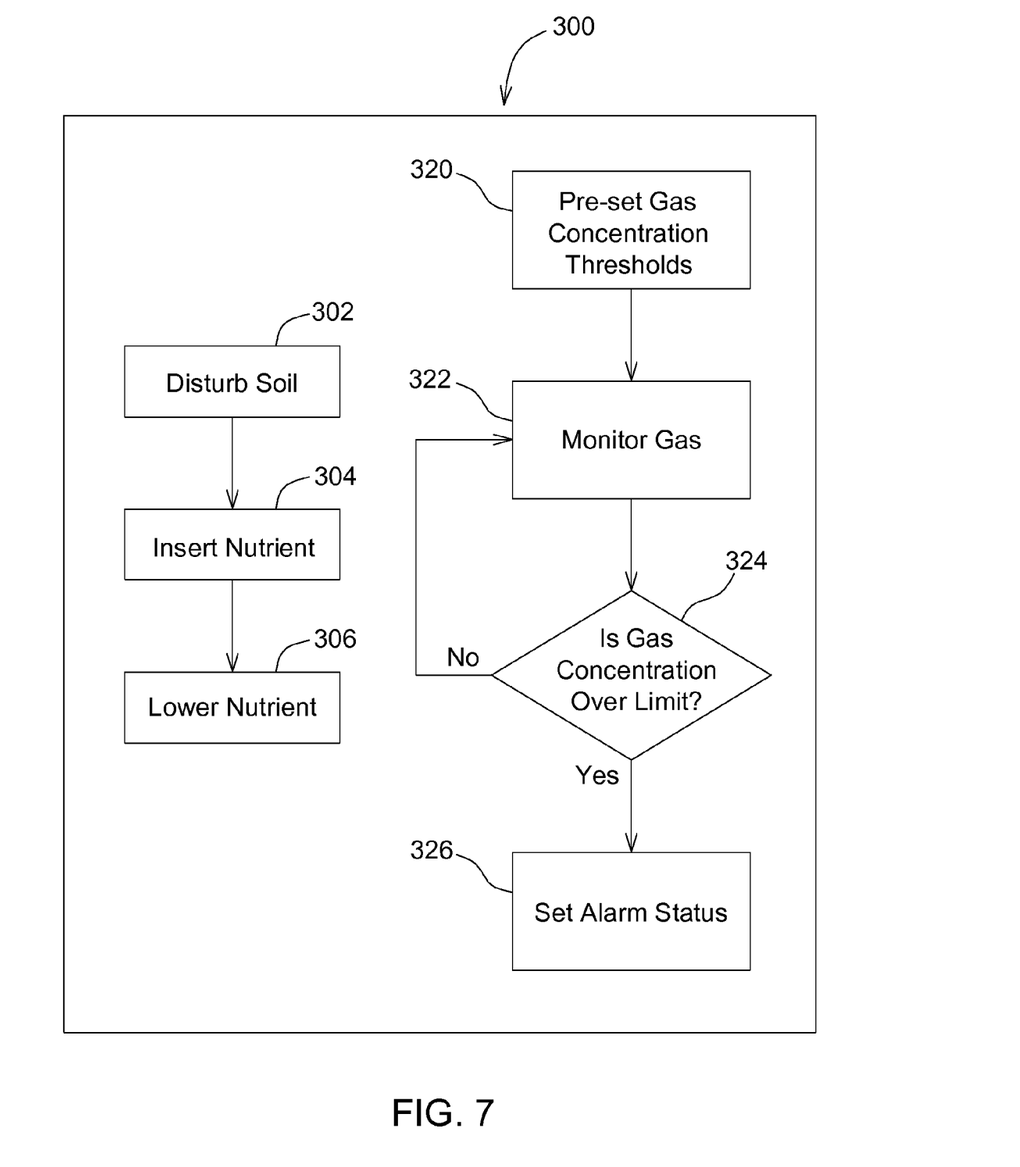
FIG. 7 depicts a flowchart of example embodiments to employ a compound application system having gas sensing capabilities.

FIG. 7 depicts example embodiments of the operation 300 of FIG. 1. In block 302, the ground engaging tool 12 first opens the soil so that the compounds are more readily put into the ground. For instance, the ground engaging tool 12 is a machine with claws or cutters that grinds the soil on a first pass over the field or forest. In block 304, a stand-alone compound applicator 14 passes over the same field or forest and inserts compounds into the soil. In block 306, after the compound is released into the soil, the compound applicator 14 is followed by wheels or blades angled so as to move or drag soil to cover over the compounds. Although the compounds are covered by soil, gas from the compounds may still seep through the soil or escape if the compounds are buried in only a shallow amount of soil (e.g. less than 4-5 inches) or if the compounds are not covered fast enough. For example, chilled, liquid anhydrous ammonia is injected into the ground but it vaporizes at a low temperature so that as soon as it is released and touches the warm ground and atmosphere, it will vaporize. The compound application system 5 also includes a gas sensor 16 that was set up to detect a gaseous state of the compound. In operation 300, there is also gas monitoring. Prior to operating in a field, in block 320, the gas monitoring computer (e.g. 120 or 124 that is located in or near the gas sensor 16, or in the autonomous vehicle 10 or at a remote computer) is calibrated to detect a particular gas and programmed with a concentration threshold. For example, a look-up table contains calibration constants and information so that for each atmospheric condition (e.g. wind, pressure, humidity, temperature), a particular value or range of values of gas concentration is deemed harmful or wasteful (e.g. too much nutrients). The gas sensor 16 is programmed to provide an indication, e.g. trip an alarm, set off a flash of light, or register a warning sound if the gas sensor 16 detects a gas beyond an a priori selected threshold level. For anhydrous ammonia, the threshold level is set in the range of 50-100 ppm as a single threshold number or as a set of numbers in the lookup table. Alternatively, the compound applicator 14 is programmed to automatically stop releasing the compound or accordingly reduces the amount of compound released when the gas detected surpasses multiple threshold levels. In block 322, when the autonomous vehicle is traversing the ground, the gas sensor 16 is turned on to detect the amount of gas in the atmosphere. The gas sensor checks for the gas concentration at different elevation levels above compound applicator 14. In block 324, the gas monitoring computer (e.g. 120 or 124) performs a lookup or comparison whether the detected gas concentration surpasses the pre-set danger thresholds (greater than or less than depending on the choice of logic set up). In block 326, if a threshold is exceeded, an alarm status is flagged and an alarm sounds or flashes from alert 24. Alternatively or in conjunction, the compound applicator 14 reduces or stops releasing the compound. In another embodiment, the response to an alarm status is tiered, or that there are variable action thresholds. For example, if the concentration of anhydrous ammonia is above 50 ppm, then a warning (e.g. sound or flash from alert 24) is issued, but if the concentration is above 100 ppm, then compound application is reduced, and if the concentration is above 150 ppm, then the application is ceased. Likewise, if the gas sensor 16 or 102 detects other gases (e.g. methane) or multiple gases, different thresholds and responses can be programmed into the memory circuits of the gas monitoring computer (e.g. 120 or 124). In different embodiments, the programming is performed at manufacturing, or even on the fly when a person is in the field and tailors the choice of thresholds to particular plants and field conditions.

In another embodiment, block 324 includes computations instead of or in addition to using lookup tables to determine acceptable gas concentrations and alarm conditions. Different models of dispersion of a gas in atmosphere are obtained through experiments or through simulation of how pollutants react in the atmosphere. For instance, climatologists, the air-force and the U.S. Environmental Protection Agency provide models such as AERMOD, CALPUFF, BLP, CALINE3, ADAM, HOTMAC, and so on. These models contain equations and/or lookup tables that take inputs or measurements of ground or atmospheric conditions (e.g. terrain, elevation, wind turbulence, etc.) and predicts how a gas would disperse under such conditions. These equations and lookup tables are programmed into the gas monitoring computer 120 and stored in the memory circuit of the gas monitoring computer 120 to accept sensor inputs and generate predicted outputs. The sensors (e.g. 16, 18, 20, 22) provide measurement data to the gas monitoring computer where the equations are stored and computations are made. The gas monitoring computer 120 calculates and generate and outputs predicted gas concentration data that are then compared with acceptable threshold levels. For example, the product (rate of dispersion×time=predicted distance traveled) yields an estimate of the path/distance of travel of gas from the ground surface to the gas sensor 16 or 102. A model of this dispersion is used in combination with the vector travel path to estimate the gas concentration at the point of origin relative to the concentration measured at the sensor. As an example, the dispersion could be modeled as a normal distribution about the path vector with the standard deviation increasing proportional to the distance the gas travels from the ground to the gas sensor 16 or 102 (expanding dispersion). If the detected or actually measured gas concentration exceeds the predicted, expected acceptable amount, the alarm condition is then set and, accordingly, the amount of compounds released may be reduced or stopped, or an alarm goes off to alert the farmer or remote operator. In an example embodiment, the equipment is automatically positioned relative to the wind to facilitate mitigation or repair of an equipment problem.

In other embodiments of block 324, calculation of NH3 plumes from spills or other excesses is performed using ALOHA and PEAC tools. In an example embodiment, a plume modeling tool is used to develop a conical volume model for the plume that contains some percentage of NH3 released within the volume at a particular height above the source of the NH3, such as at 90% height of the plume cone, for particular environmental factors considered by the model, and for a period of time such as four to five seconds. Within this volume there can be other iso-surfaces such as at 50% or 10% surface. There may also be a line representing the center of the distribution. The line may be straight, segmented, curved, and so on. Rather than represent a percent of material, the iso-surfaces may alternatively represent a percentage of a maximum gas concentration reading. This calculation is repeated for each nutrient or compound source injection point across an applicator, if there are multiple sources of nutrients or compounds released.

In yet other embodiments of block 324, if not taken into account as part of the original modeling, the calculated cones are oriented to receive measurements such as the current applicator speed and wind speed. When there is little or no-wind, the plume would typically rise straight up. But if there is some wind, the calculated cones are tipped or slanted at an angle from vertical.

The contributions of NH3 from each calculated cone for a point in space and time are added together. In one implementation, the conical volumes are each represented as non-zero values in a three dimensional matrix and the elements added together. The result is a new volume of total gas concentrations across the compound application system 5 or agricultural assembly 50. This total gas concentration volume has multiple potential uses. In one example, data from fixed sensors on the periphery of the plume can be used to estimate levels elsewhere in the plume and the total NH3 escaping. For instance, the measured values from three sensors may be used to estimate gas amounts elsewhere in the cone volume.

In other embodiments, such as where a plume model is not available, a movable sensor may scan a plane or volume to measure gas concentration and build a 2D or 3D model of that concentration. If a plume model is available, the scanned data may be used to validate or tune the model for the operating environment.

Figure 8:
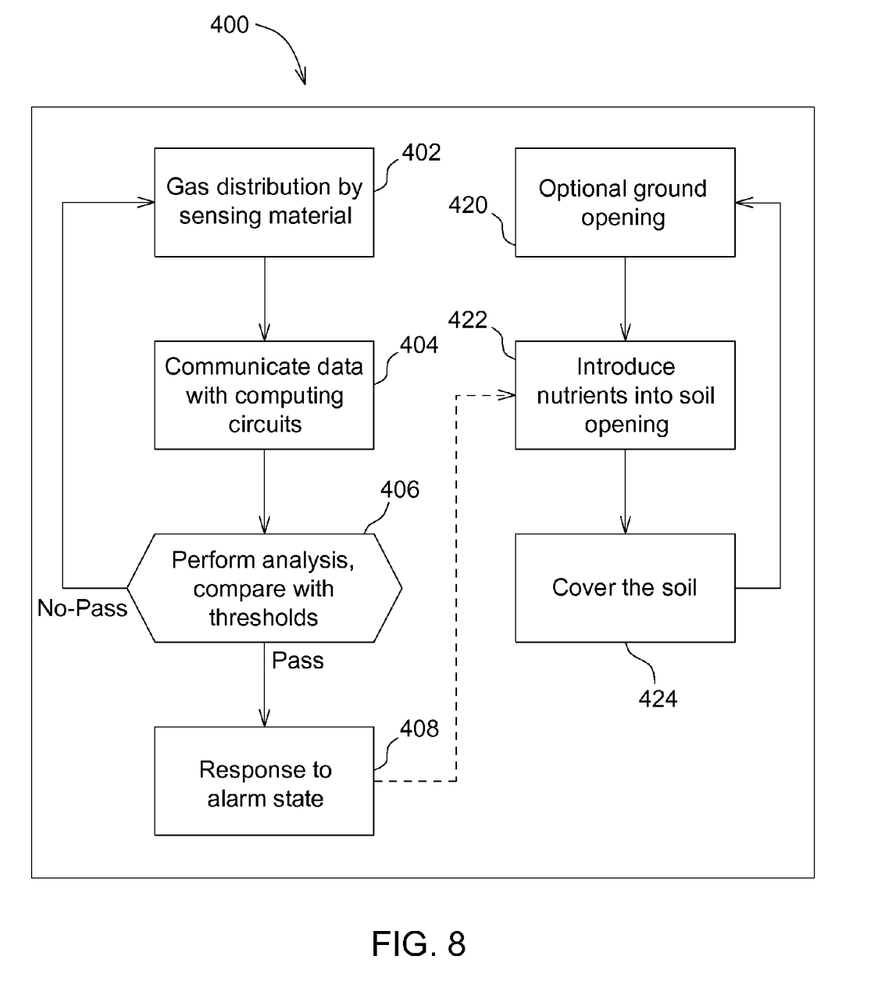
FIG. 8 depicts another example flowchart showing an example way of employing the arrangements of nutrient applicator and gas detector.

FIG. 8 depicts an example operation 400 of an example detector system 100 together with an example agricultural assembly 50. In block 402, gas sensing occurs and generates raw analog gas concentration data (e.g. ions on an electrode, microscopic chemical reaction of gas molecules on semiconductor metal oxide material). In block 404, communications between members of the detector system 100 with the autonomous or tractor 52 or even with a remote location, is performed either wired or wirelessly. Detector system 100 communicates raw analog gas concentration data to a computing device such as the central computing unit 120 or detector computing unit 124 or sensor logic unit 128 that processes and converts the raw signal into a gas concentration value at a location over a lateral row of crops or plants. The gas sensors 102 have an electrically-wired (e.g. through CAN bus or some other vehicle bus standard) or wireless (e.g. local WIFI hotspot) connection to a central computing unit 120 that is on the cab 53 of the tractor 52. Alternatively, the central computing unit 120 is located away from the cab 53 but still on the tractor 52 (e.g. a semi-autonomous tractor), or located in a remote location in which case there is wireless communication (e.g. 802.11 WIFI) between the gas sensors 102 and the computing unit 120 through signal transceivers. An alternative configuration is that the detector system 100 has a detector computing unit 124 that locally receives and processes all of the sensing information from the individual gas sensors 102. Gas sensors 102 communicate either wirelessly or by electrical wire with the detector computing unit 124 that controls each gas sensor 102.

In block 406, regardless of which computing device performs the calculations and comparisons, the device decides whether there is an alarm condition, whether the collected sensed gas information is past certain thresholds. Either the detector computing unit 124 or the central computing unit 120 also tracks historical or time-varying information, which allows for calibrations and corrections for hysteresis and stray erroneous reads from the gas sensors 102. In block 408, if there is an alarm state, the computing units 124 or 120 rapidly (e.g. milliseconds) shut off the delivery of the NH3 liquid and alert a person about dangerous gas. In another embodiment of the partitioning of the data computation and processing, each gas sensor 102 itself has a feedback loop, processing and control circuitry or an algorithm in a local sensor logic unit 128. Such local feedback and control enable a gas sensor 102 to quickly shut off the delivery of the NH3 liquid and alert a person about dangerous vapors.

Example operation 400 occurs regardless of the partitioning of the responsibility to process and make decisions among the local sensor logic unit 128 or the detector computing unit 124 or central computing unit 120. The sensing element such as chemical sensing onto electrodes is generally an analog signal that can be converted by an ADC and the digital signals are then analyzed and stored in memory circuit, compared with the value of an alarm threshold, notify an alarm condition, and so on. Alternatively, the sensor and alarm indicator are analog circuits (amplifier, comparator, output driver) processing analog signals and an analog comparator trips when the sensed signal is past a threshold and an alarm or other warning goes off. Data processing includes embodiments such as threshold detection if the sensed gas passes some pre-set limit for toxicity (e.g. 50-100 ppm). To avoid false alarms, hysteresis or some other method such as time averaging several values together or digital or analog filtering is included to preprocess the signals before comparator and threshold detection.

In FIG. 8, the example operation 400 also includes the functionality of the agricultural assembly 50 that travels up to high speeds (e.g. over 10-15 miles per hour), with low-draft characteristics to enable faster injection of anhydrous ammonia such as to cover over 50 acres an hour. Optionally, in block 420, there are ground engaging tools (e.g. drills, coulters, shanks, disks) that open the soil, create narrow trenches or drill holes in the soil. The soil opener 68 cuts a groove in the soil. In block 422, the nutrient applicator 60 releases or propels compounds like $NH_3$ into the soil openings. NH3 is metered from an NH3 tank 104, dividing the liquid NH3 into multiple streams using a manifold 106. The streams are conveyed to outlets associated with each soil opener 108 mounted on field cultivator 102. As the liquid NH3 traverses the tubes 64 and manifolds 106, it heats up due to friction effects and may already start to vaporize so that a gaseous-liquid phase of the anhydrous ammonia is delivered out of the tube openings 66. If the tubes 64 or manifolds 106 are chilled, the compound tends to remain in the liquid state. The nutrient applicator 60 places nitrogen fertilizer under the soil surface and seals it there, reducing the risk of volatilization (if the anhydrous ammonia is not already in a gas phase) and surface runoff during rainfall events or under high winds (e.g. over 20 miles per hour). The anhydrous ammonia is placed about 4 to 8 inches into the soil.

In block 424, closing tools or closing disks 150 at the rear of agricultural assembly 50 or at the rear of the compound applicator 14 or feed duct 62 pushes soil back over the openings, covering the compounds. The NH3 is bound into the soil after the agricultural assembly 50 passes over the soil. In practice, the desired amount of NH3 is sometimes not bound to the soil for reasons such as equipment malfunction that causes NH3 to escape directly in the air without reaching the outlet, a lack of a good seal over the fertilizer after it is deposited, or soil conditions. Rather than monitor the retention of the chemicals in the soil, one embodiment is to monitor and analyze the air above the soil and attempt to distinguish particular gas as belonging to a substance such as NH3. If there is an alarm state in block 308 due to an over concentration of NH3 gas in the air, then block 422 responds accordingly to reduce or stop the flow of nutrients or to signal an alert 24.

In some embodiments of block 404 using a centralized processor 120 that performs many tasks, the central processor 120 runs a state machine or scheduler to periodically check the status of the sensors 116. Alternatively, the central processor 120 can be programmed to be automatically interrupted by urgent signals indicating a presence of a dangerous gas, and then the central processor 120 can send a signal to, for example, alert 24 to issue an indication of a problem.

In some embodiments of block 406, the processor circuit compares the value of individual or aggregated gas sensor 102 readings to a threshold value or set of thresholds. If the threshold values are exceeded, the processor circuit flags a status bit to generate an alerting signal or perform tiered shutdown of released chemicals. During manufacturing, descriptions of such procedures and how to hook up the equipment are included in the operator manuals to instruct the end-users. Alternatively, assembly manuals also advise manufacturing employees or customers and end-users how to mount the gas sensors and where to mount the sensors relative to a direction of travel or relative to where the chemical applicators are placed. For instance, the gas sensors should be positioned where they can capture the drift of the ammonia under various weather conditions.

In some embodiments of block 406, the processor circuit adjusts the values of the raw gas sensor 102, by taking into account position and time information from GNSS/GPS receivers regarding the gas sensors 102. The adjusted data values are stored locally in a data file or memory circuit and wirelessly transmitted to another machine on the field or to a remote location. The data may also be displayed to a tractor operator or remote operator so that the operator can make real-time decisions as to what to do about the existing gaseous information in a particular region. If there is interference and the GPS/GNSS does not deliver accurate location readings, then instead of or in addition to geo-referencing the data, the data may also be phytoreferenced. Phytoreferencing is useful for NH3 applications (e.g. side-dressing) when small plants are present.

Finally, the orientation and directions and positions stated and illustrated in this disclosure should not be taken as limiting. Many of the orientations stated in this disclosure or claims are with reference to the direction of travel of the equipment. But, the directions, e.g. "behind" can also are merely illustrative and do not orient the embodiments absolutely in space. That is, a structure manufactured on its "side" or "bottom" is merely an arbitrary orientation in space that has no absolute direction. Also, in actual usage, for example, the equipment may be operated or positioned at an angle because the implements may move in many directions on a hill; and then, "top" is pointing to the "side." Further, for the unmanned autonomous vehicle 10, another configuration is place the compound applicator 60 in front of the autonomous vehicle 10 and all of the sensors, including the gas sensor 16, on the autonomous vehicle 10. There is little danger to humans if vehicle 10 is unmanned. Thus, the stated directions in this application may be arbitrary designations.

Additionally, although this disclosure focuses on nitrous fertilizers, phosphate and sulfuric fertilizers may also be monitored. In addition to fertilizers, pesticides may also be treated in a similar manner. A sensor system is situated on various possible agricultural implements or assemblies such as a nutrient applicator, a ground engaging tool, applicant tank, or an agricultural vehicle or self propelled sprayers. Also the farming or forestry vehicles are manned or unmanned in alternative embodiments depending on the type of plant or application (e.g. crops, winery, orchards, trees). Various features are set forth in the following claims.

What is claimed is:

1. A vapor monitoring system on an agricultural implement, the system comprising:
    a nutrient applicator configured to inject compound into a soil surface;
    a sensor configured to detect a gas corresponding to the compound under the soil surface, wherein the sensor is located directly or indirectly above a release end of the nutrient applicator; and
    wherein the vapor monitoring system is configured to generate an indication when a concentration of the gas passes a threshold.

2. The vapor monitoring system of claim 1, further comprising a gas monitoring processing circuit having an alarm, wherein the gas monitoring processing circuit is electrically coupled to the nutrient applicator to reduce or stop further injection of the compound based on a gas alarm condition.

3. The vapor monitoring system of claim 1, further comprising a ground engaging tool positioned at a lower end of the agricultural implement to open the soil surface, wherein the nutrient applicator is mounted to the agricultural implement and is behind the ground engaging tool to release the compound into the opened soil surface, and wherein the vapor monitoring system is set up to generate the indication when the concentration of the gas passes the threshold while planting a crop.

4. The vapor monitoring system of claim 1, wherein the sensor includes an attachment to the agricultural implement using at least a magnetic material, an adhesive, or a fastener, wherein the sensor is re-locatable free of mechanical tools.

5. The vapor monitoring system of claim 1, wherein the agricultural implement is hitched to a motorized vehicle, and wherein the vapor monitoring system is set up to generate the indication when the concentration of the gas passes the threshold while planting a crop.

6. The vapor monitoring system of claim 1, wherein the compound includes at least one of a plant fertilizer, a pesticide, or organic waste.

7. The vapor monitoring system of claim 1, further comprising atmospheric sensors mounted on the agricultural implement and a location indicator of the agricultural implement.

8. The vapor monitoring system of claim 7, further comprising a memory circuit of a gas monitoring computer that stores a gas dispersion equation in the memory circuit, wherein the gas monitoring computer receives measurements from the sensor, and the atmospheric sensors and the location indicator to generate an alarm of excessive gas computed from the gas dispersion equation.

9. The vapor monitoring system of claim 1, wherein the indication is based at least in part on a lookup table having an acceptable gas threshold level that is correlated with an atmospheric condition.

10. An agricultural assembly having a detector, the agricultural assembly comprising:
a soil cutting tool attached to the agricultural assembly;
a feeding dispenser mounted to the agricultural assembly behind the soil cutting tool, wherein the feeding dispenser is designed to inject a chemical into the soil;
a gas sensor mounted to the agricultural assembly above the feeding dispenser; and
wherein the detector includes an alarm that indicates an excess concentration of a gas phase of the chemical based on a dispersion calculation or a lookup table.

11. The agricultural assembly of claim 10, further comprising a gas monitoring processing circuit electrically coupled to a flow controller for the feeding dispenser to revise injection of the chemical based on an alarm condition, wherein the alarm condition is generated in the gas monitoring processing circuit.

12. The agricultural assembly of claim 10, further comprising a gas monitoring processing circuit where the alarm is generated, and the gas monitoring processing circuit monitors the gas phase of the chemical and is electrically or wirelessly coupled to a visual or auditory or haptic alert that indicates an alarm condition associated with the gas phase of the chemical.

13. The agricultural assembly of claim 10, wherein the feeding dispenser is positioned low enough that a dispensing tip of the feeding dispenser is below an anticipated ground surface level.

14. The agricultural assembly of claim 10, wherein the chemical includes a plant fertilizer, and wherein the alarm indicates the excess concentration of the gas phase of the chemical during planting of a crop.

15. The agricultural assembly of claim 10, further comprising wind and temperature sensors and a location determiner that provides sensed information to a determination of the alarm.

16. A method of using a vapor monitoring system, the method comprising:
mounting a gas sensor above and behind a compound applicator, wherein behind is directly or indirectly opposite a direction of travel of the compound applicator;
positioning a dispenser of the compound applicator below the gas sensor, the dispenser positioned low enough to inject a compound below a surface-level of a ground; and
accessing a gas dispersion calculation program in a gas monitoring computer associated with the gas sensor indicating an alarm level of a pre-determined gas if a concentration of the predetermined gas exceeds a threshold.

17. The method of claim 16, further comprising coupling the gas monitoring computer to the compound applicator to turn off compound injection upon detection of an excess of the pre-determined gas in atmosphere.

18. The method of claim 16, further comprising instructing attaching the compound applicator and the gas sensor to a frame towed by an agricultural motorized vehicle.

19. The method of claim 16, further comprising adding gas sensor information to calculate a plume cone to determine an excess of the pre-determined gas detected in atmosphere.

20. The method of claim 16, further comprising instructing attaching the compound applicator and gas sensors to an agricultural motorized vehicle.

* * * * *